Patented Feb. 18, 1941

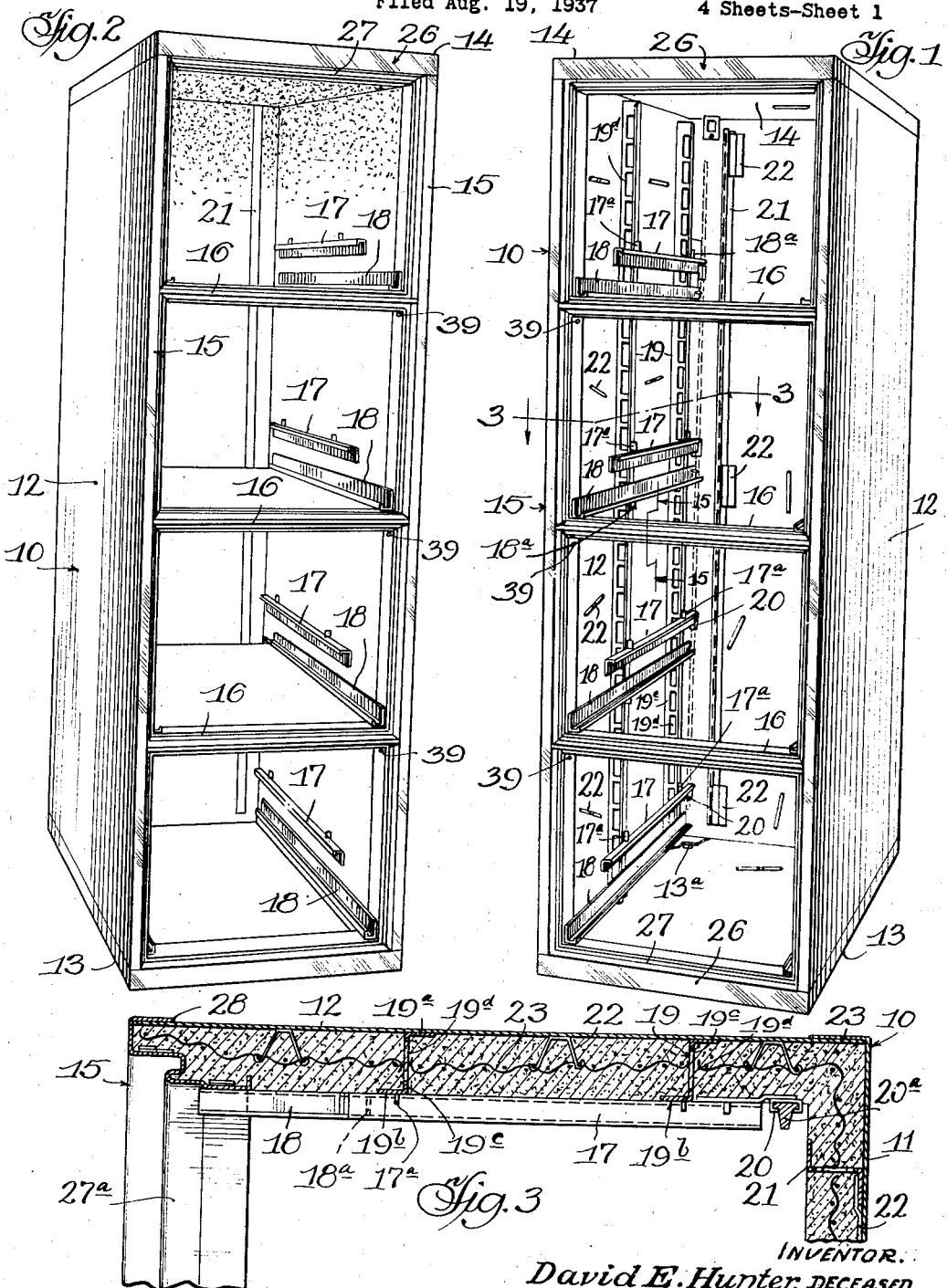

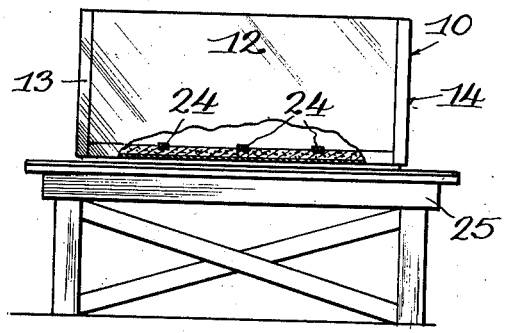
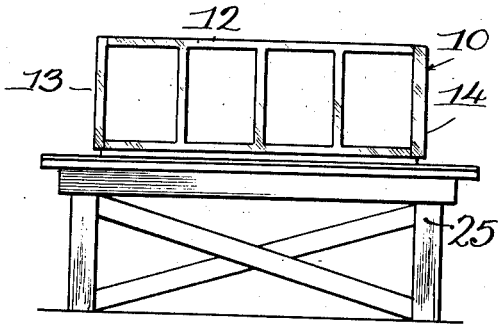
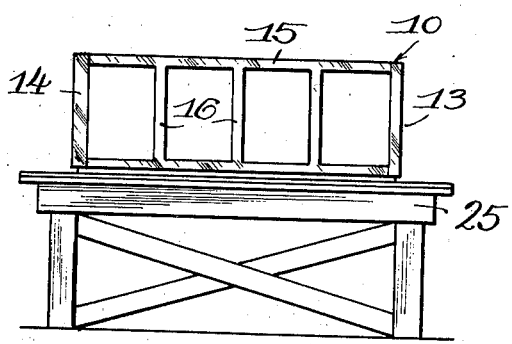
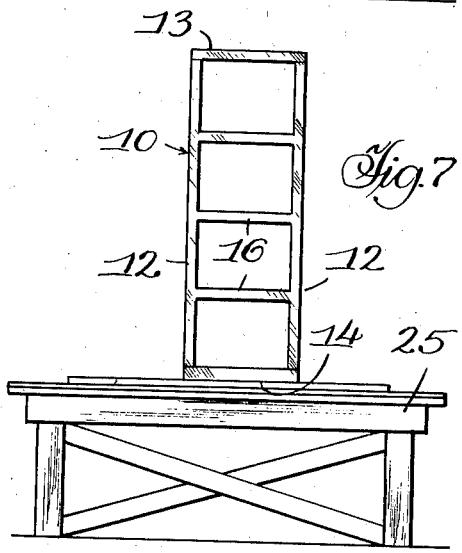
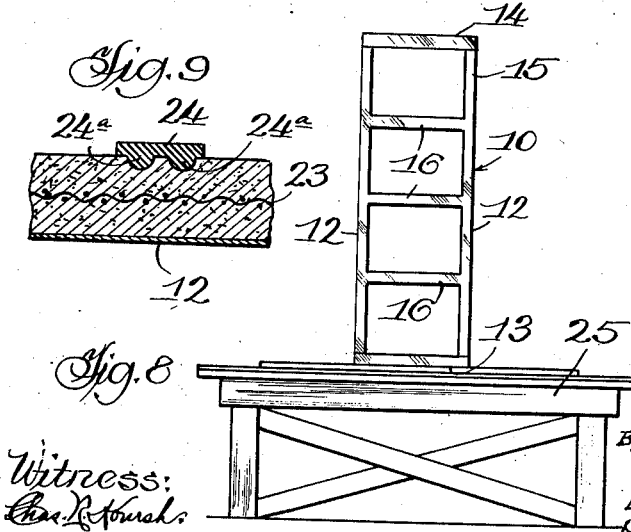
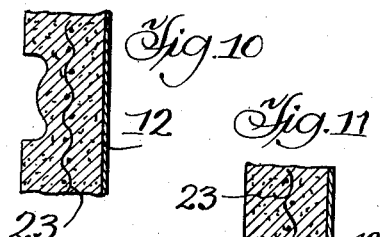

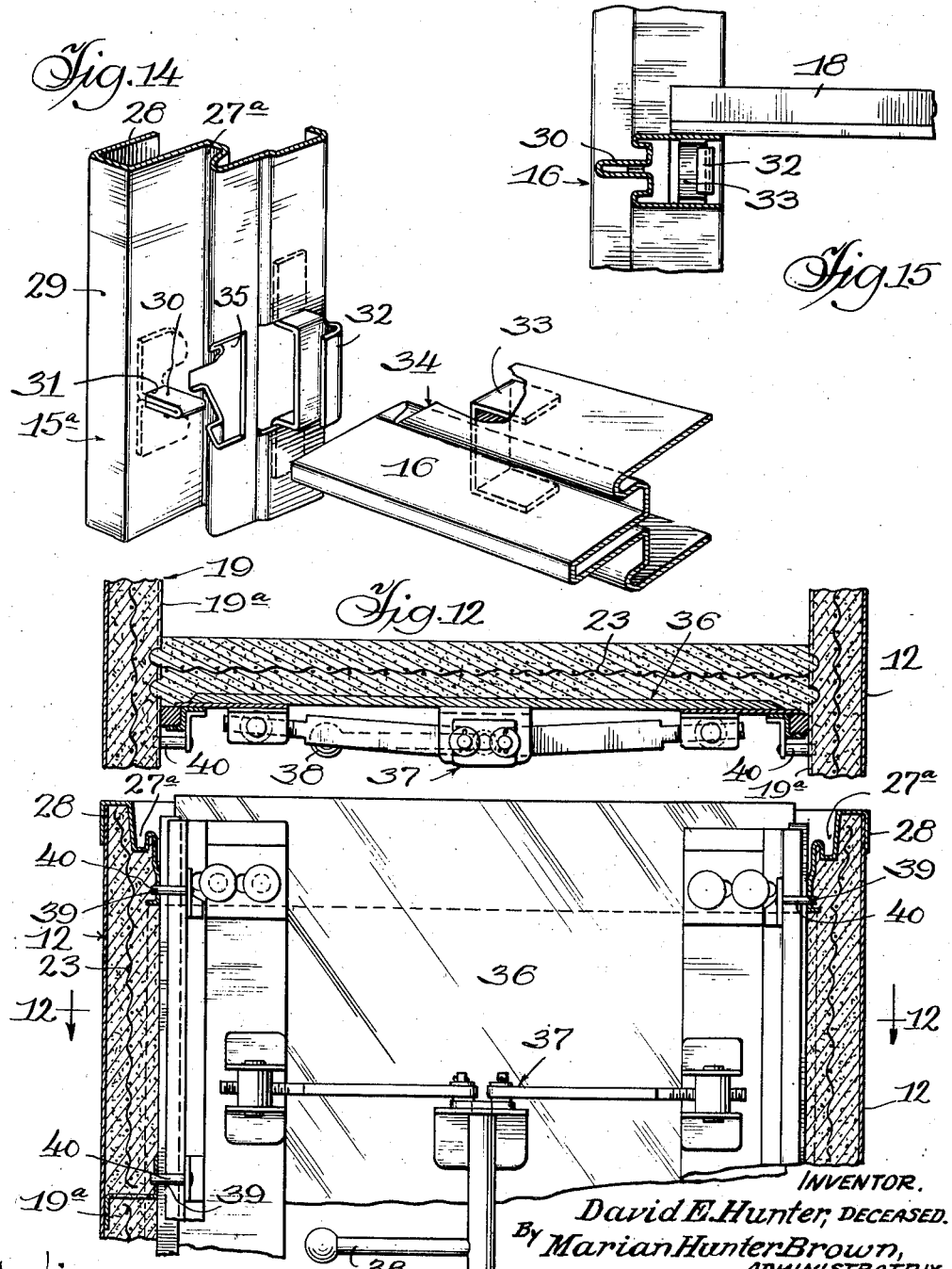

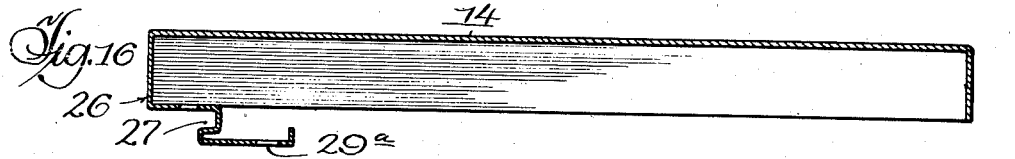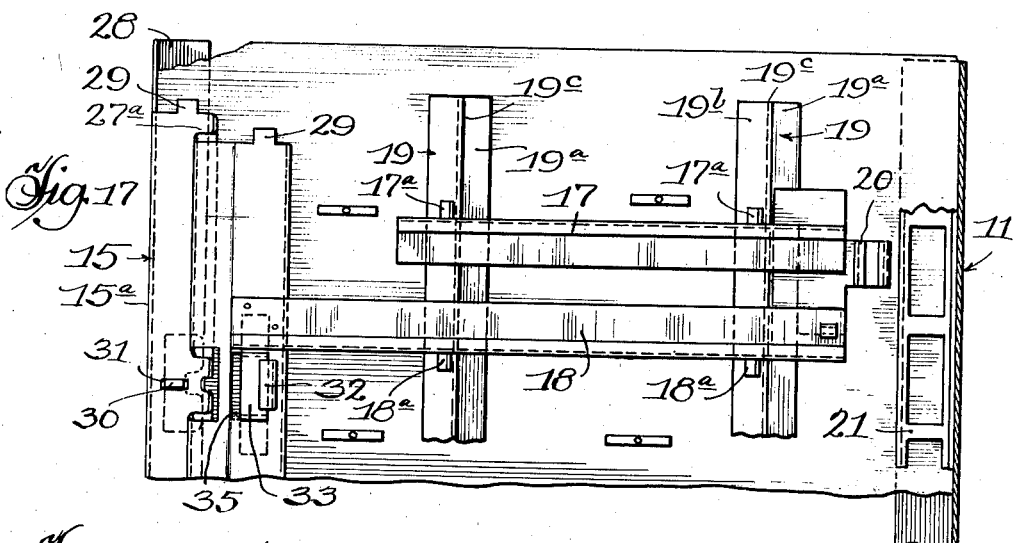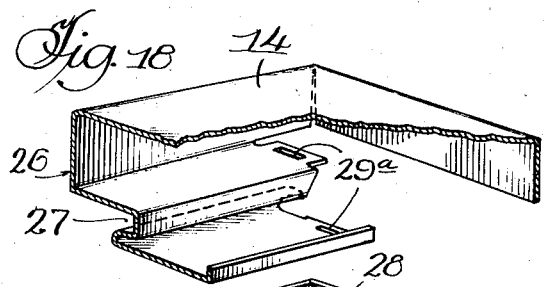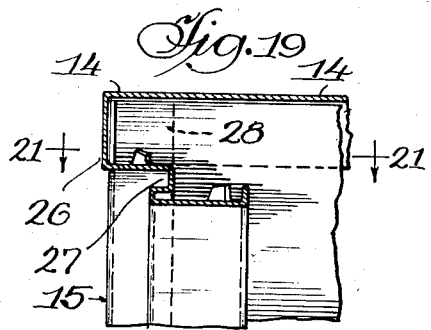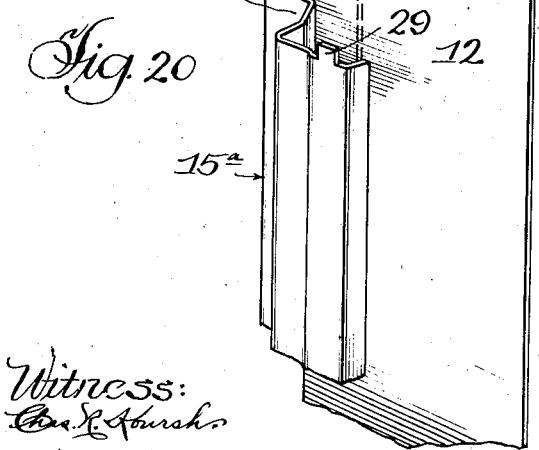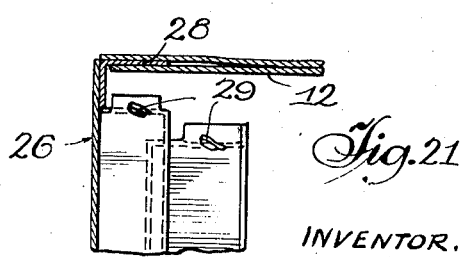
INVENTOR.
David E. Hunter, DECEASED.
By Marian Hunter Brown,
ADMINISTRATRIX.

2,232,004

UNITED STATES PATENT OFFICE 2,232,004

PROCESS FOR MAKING HEAT RESISTING FILING CABINETS

David E. Hunter, deceased, late of Muskegon, Mich., by Marion Hunter Brown, special administratrix, East Greenwich, R. I., assignor to The Shaw-Walker Company, Muskegon, Mich., a corporation of Michigan Application August 19, 1937, Serial No. 159,984

7 Claims. (Cl. 25—154)

This invention relates to a novel and improved process for making heat-resisting filing cabinets. The filing cabinet is of the kind shown in Patent No. 1,678,471 granted July 24, 1928.

A filing cabinet of the kind comprises an outer metal shell and an inner lining of insulation material such as gypsum, stucco or the like, and includes one or more partitions to divide it into vertically disposed compartments, said partitions being made of like insulation material.

In insulated cabinets of the kind heretofore, where the insulation is exposed on the inside of the cabinet, difficulty has been encountered in providing the required support for the rails and channels which carry the drawers for the compartments. This was because the only means of support to be had was vertically extending metal bars embedded on the inside of the insulation material in the process of forming the monolith which comprised the insulation lining.

The object of the present invention is to provide a process for producing economically and effectively an insulated filing cabinet of the kind wherein the required supporting rails and channels are rigidly supported from the ouside metal shell, but with a minimum of heat-conducting metal extending from the cutside shell to the inside of the insulation.

The advantages of this invention will appear more fully as this application proceeds.

In the drawings:

Fig. 1 is a perspective view of the metal casing or shell of a filing cabinet as it appears when complete and ready to receive the insulation lining and insulation partition walls.

Fig. 2 is a perspective view of the same looked at from a different point of view than that of Fig. 1, but showing the completed cabinet with the insulation walls and partitions complete therein.

Fig. 3 is a transverse section through the filing cabinet in a plane indicated by the line 3—3 of Fig. 1.

Figs. 4, 5, 6, 7 and 8 are each a side elevation of a table with a cabinet shell or casing thereon, the figures in succession showing the casing in different positions in successive steps of the process, to be referred to more particularly as the specification proceeds.

Figs. 9, 10 and 11 are detail sectional views showing the application of a beaded mold to provide grooves in the upright walls of the insulation lining, to receive corresponding tongues which are formed in the process of pouring the partition walls defining the compartments.

Figs. 12 and 13 show respectively a transverse section and a bottom plan view of a mold board used in pouring the partition walls of the cabinet.

Figs. 14, 15, 16, 17, 18, 19, 20 and 21 are detail sectional views showing the construction of the metal casing or shell, all of which will be referred to more particularly in the specification.

The improved process as herein illustrated is applied to the manufacture of an insulated filing cabinet of the kind, provided with a plurality of vertically disposed drawer compartments. Referring more particularly to Figs. 1, 2 and 3:

10 indicates the metal casing of the cabinet. This is open at the front and includes a back plate 11, side plates 12, 12, a bottom plate 13 and a top or cap plate 14. Said plates are all rigidly connected together in any familiar manner, as by welding. 15 indicates the channel member fixed to the front of the casing and comprising upright side members and cross rails 16 fixed to said side members and defining the compartment openings. The side members and rails as well as the channels defining the top and bottom of the cabinet opening are formed with rabbets and ribs extending around the drawer openings to receive complementary ribs and grooves on the front walls of the drawers in the familiar manner. The preferred structure of the channel member 15, of the cross rail 16 and of the means connecting them together and to the casing, will be described hereafter. But it is to be understood that the process is not to be limited to said preferred construction.

17, 18 indicate the familiar upper and lower horizontal metal rails located on each side wall of each compartment to support and retain the rolling mechanism of the cabinet drawers. 19, 19 indicate horizontally spaced, vertical bars extending substantially the full height of the cabinet and fixed to each side plate 12 of the casing. Said bars are Z-form in cross section. The web 19$^c$ of each of the bars 19 is cut away to form vertically spaced, wide openings 19$^d$ throughout its length, leaving an attenuated web, with a minimum of metal to extend from the outer casing to the interior of the cabinet for heat conduction in case of fire. Each bar 19 has one flange 19$^a$ spot-welded to the associated side plate 12 (see Fig. 3). The other flanges 19$^b$ of the bars fixed to a side wall of the casing, have spot-welded to them the rails 17 and 18 of the several compartments through which they extend. Said flanges have preferably formed on them stops 17$^a$, 18$^a$, a pair of the same for each compartment, for locating said channels or rails 17 and 18.

The usual bearing plates and guide clips 20 for the vertically extending lock bar for the several drawers are located on one side wall of the casing (the left wall as shown in Fig. 1), are spot-welded to the rear ends of the rails 17 and 18, and are thus indirectly supported by the rear bar 19.

21, 21 indicate laterally spaced vertical bumper bars extending substantially the full height of the cabinet. Said bars are of the same Z-form construction as the bars 19, 19 with the attenuated webs, having a minimum of metal. The rear flange of each bar is attached to the rear wall plate 11 of the casing by vertically spaced metal clips 22, spot-welded to said plate. The front flange provides a bumper to receive the shock of the drawers when forcibly pushed into their respective compartments.

22a indicates the familiar bendable clips spot-welded to the several wall plates of the casing and designed for engagement with the usual reinforcing chicken wire mesh 23 to hold it in suitable spaced relation to the associated wall plate.

In the manufacture of the cabinet the several wall plates are cut and formed. The rails 17, 18 are spot-welded to the associated spaced Z-bars 19 in the required relation. For one side wall, the lock bar bearing plates and guide clips are spot-welded to the rear ends of said rails. As a result there is a grille of bars and rails with attenuated bar webs presenting rigid strength for rail support but having a minimum of metal for heat conduction to said rails. Said grille is then secured to the associated side wall by spot-welding the rear or base flanges 19a of the bars 19 to the associated side wall. The bumper bars 21 are secured to the back wall plate 11 by the clips 22 previously spot-welded to said wall.

Then the several walls, back wall 11; side walls 12, 12; bottom wall 13; top or cap wall 14, and the front channel 15 with its horizontal rails 16, are assembled and secured together. The result is the metal structure shown in Fig. 1. This metal structure is then painted or enameled, baked and finished in a familiar manner.

We now have a finished, complete metal structure including a metal casing for a filing cabinet, the transverse rails for the drawers, the lock bar guide clip on one side wall, and the bumper bars on the back wall, all rigidly supported in such spaced relation to the walls of the casing as to provide for the designed thickness of the insulation lining. And this is all provided with a minimum of metal for conducting heat through said insulation lining to the interior of the cabinet in case of fire. In other words, we have a prefabricated metal structure, including all the metal parts that project into the interior of the cabinet beyond the insulation lining, ready for the application of the insulation lining itself. This is applied as follows:

First, the wire reinforcing mesh 23 is applied to the several walls of the metal casing and in the spaces defined by the transverse rails 16 of the casing and the bottom rails 18 for the drawers defining the planes of the intermediate walls of the compartments in the usual way. Next, a steel bar is inserted through a hole 13a in the bottom plate 13 (left for the purpose) and through the several aligned guide clips 20 to act as a core for the space in the insulation to be occupied by the lock bar.

The casing 10 is now placed on its head, or as shown in Fig. 4, on its back plate 11, on the top of a table 25, which is brought to a horizontal level in any suitable manner. The insulation material, gypsum or the like, mixed with water to the flowing consistency of cream, is then prepared in an amount required to cover the back wall to the designed thickness of insulation. The mix is then poured upon the back wall plate until it comes to a level with the plane of the inner flanges of the bumper bars 21. Preferably, preliminary to this pouring, metal molds 24 as shown in Figs. 4 and 9, are placed to rest transversely on the bars 21 in the planes of the associated cross rail 16 defining the location of the partition walls. Said molds 24 are formed with one or more beads or ribs 24a to leave transverse grooves in the surface of the insulation when the mold is removed, as shown in Figs. 10 and 11.

The insulation material is allowed to set. After it is set and the molds 24 removed, the cabinet is placed on a side wall, and the treatment of the back wall is repeated in connection with the side wall, like molds 24 being again used to form grooves in the side walls in the plane of the cross rails and of the grooves already formed in the back wall.

Then in succession the insulation is applied in like manner to the other side wall, as shown in Fig. 6. In applying the insulation to the sides and back, of course, the rails 17 and 18 are left exposed as well as the inner faces of the flanges of the Z-bars 19, 19 to which said rails are attached and the flanges of the Z-bars 21, 21 at the back.

The casing is then turned about to bring its head 14 to rest on the table as shown in Fig. 7, and the insulation poured there as in the cases previously described. We now have the insulation applied to the back, the sides and the top wall of the casing.

Suitable mold boards 36 are now inserted below the planes of the reinforcing wire netting of the partition shells defining the drawer openings. The said mold boards are expandible and are operable by toggle linkage 37 operated by an arm 38 in the familiar manner. The position of said mold boards is determined by holes 39 in the stiles and the front flanges of the Z-bars 19 formed on the side walls for the purpose. Said holes are engaged by pins 40 (see Figs. 12 and 13) extending from the mold boards.

The cabinet is then placed on the table 25, top up as in Fig. 8, and the table is leveled up as before. An amount of insulation is then prepared, preferably for the two upper partition walls, which are poured in succession and allowed to set. Then the lower partition wall and the bottom wall of the cabinet are poured and allowed to set. The several mold boards 36 are then removed, the core bar 20a is withdrawn, and the filing cabinet is dried out and baked in the usual manner.

The construction and arrangement by which the frame 15, the cross rail 16 and top and bottom rails are connected together, is preferably as follows: The top and bottom plate are provided at the front with an integral flanged lintel 26 with the familiar rabbet and rib construction 27. Each vertical stile 15a of the flanged frame 15 is connected by flange 28 to the associated side wall 12 of the casing. Said stiles are likewise formed with a corresponding rabbet and rib construction 27a, as shown in Fig. 20. The stiles 15a and the lintels 26 are formed to provide between them a mitered joint and are connected by tongues 29, 29 on the stiles, and openings 29a, 29a on the lintels, being held together in this relation by twisting the tongues as shown in Figs. 19 and 21.

The bottom plate 13 is connected to the stiles in substantially the same way.

The rails 16 are attached to the stiles 15ª, 15ª in the following manner as shown in Figs. 14 and 15: In the side face of the stiles is provided a centering projecting lug 30 as shown in Fig. 14. Said lug is made of a T-shaped clip having its base spot-welded to the inside face of the flanged rail, and the lug itself projecting through an opening 31 in said stile. Spaced from the lug 30 is a metal strip welded at its ends to the inside of the flanged stile projecting through an opening therein to form a stirrup 32 spaced from the face of the stile. The flanged rail 16 has a cross bar 33 with flanged ends spot-welded to the inner faces of said flanged rail 16. The end of the rail is mitered as indicated at 34, and the stile has a mitered opening 35 to receive the end of said rail. To assemble the rail on the stile the rail is brought to engagement with the lug 30 on the stile and is then pushed back to bring the mitered parts of the rail and stile into engagement. In this movement the cross bar 33 and the rail will engage under the stirrup 32, which may be then clamped by pliers or otherwise to the cross bar so as to lock the rail and stile in position. The same procedure is followed in connection with all the rest of the rails.

The above described construction is rigid and strong and may be set up with a minimum of labor. However, as already pointed out, the invention is is no way limited thereto.

It is claimed:

1. The process of making a fire-resistant cabinet body open at the front and comprising an outer metal casing having an insulation lining and an insulation partition wall dividing said body into drawer compartments,—which consists in prefabricating a structure including the outer metal casing having back, side, top and bottom walls, a horizontal rail defining the openings to said compartments, thin metal, laterally spaced, vertically extending bars having perforate webs of depth equal to the required thickness of the insulation lining to be applied to each side wall, and suspension rails for drawers for each of the several compartments fixed to said bars; then inserting within the casing a removable board in position to mold the bottom of a partition wall; disposing the metal casing in a position with one wall in a horizontal plane; preparing cementitious insulation material mixed with water to the flowing consistency approximating that of cream; pouring upon said last mentioned wall said fluid cementitious mix and allowing it to flow over said last mentioned wall until it has attained a level corresponding to the required depth of the insulation lining and then permitting said insulation to set; thereafter turning said casing to successively dispose each of the remaining walls and said mold board in a horizontal plane and pouring said cementitious material on each wall and said board and permitting the same to set while each wall and said board are in horizontal position and then withdrawing said mold board,—thus providing an insulation structure with a a partition wall and having rigidly supported suspension rails for drawers in each compartment.

2. The process of making a fire-resistant cabinet body open at the front and comprising an outer metal casing having an insulation lining,—which consists in prefabricating a structure including the outer metal casing having back, side, top and bottom walls defining the opening to a compartment, thin metal, laterally spaced, vertically extending bars having perforate webs of depth equal to the required thickness of the insulation lining to be applied to each side wall, and suspension rails for a drawer for said compartment fixed to said bars; disposing the metal casing in a position with one wall in a horizontal plane; preparing a cementitious insulation material mixed with water to the flowing consistency approximating that of cream; pouring upon said last mentioned wall said fluid cementitious mix and allowing it to flow over said last mentioned wall until it has attained a level corresponding to the required depth of the insulation lining and then permitting said insulation to set; thereafter turning said casing to successively dispose each of the remaining walls in a horizontal plane and pouring said cementitious material on each wall and permitting the same to set while said wall is in horizontal position,—thus providing an insulation structure having rigidly supported suspension rails for a drawer in said compartment.

3. The process of making a fire-resistant cabinet body open at the front and comprising an outer metal casing having an insulation lining and an insulation partition wall dividing said body into drawer compartments,—which consists in prefabricating a structure including the outer metal casing having back, side, top and bottom walls and a horizontal rail defining the openings to said compartments, thin metal, flanged, laterally spaced, vertically extending bars having perforate webs of depth equal to the required thickness of the insulation lining to be applied to each side wall, and suspension rails for drawers for each of the several compartments fixed to said bars; then, after bringing it to a horizontal level, in pouring separately upon each wall the insulation material to the required depth of the insulation lining and permitting it to set; then, after inserting within the body a removable mold board for the bottom of said partition wall, in pouring thereon the insulation material in like manner to the required depth on said mold board and permitting it to set; and in then withdrawing said mold board:—thus providing a polylithic structure with partition walls of insulation material and having rigidly supported suspension rails for drawers in each compartment.

4. The process of making a fire-resistant cabinet body open at the front and comprising an outer metal casing having an insulation lining and an insulation partition wall dividing said body into drawer compartments,—which consists in prefabricating a structure including the outer metal casing having back, side, top and bottom walls and a horizontal rail defining the openings to said compartments, thin metal, laterally spaced, vertically extending bars having perforate webs of depth equal to the required thickness of the insulation lining to be applied to each side wall and to the back wall, and suspension rails for drawers for each of the several compartments fixed to said bars on the side walls; then, after bringing it to a horizontal level, in pouring separately upon each wall the insulation material to the required depth of the insulation lining and permitting it to set; then, after inserting within the body a removable mold board for the bottom of said partition wall, in pouring thereon the insulation material in like manner to the required depth on said mold board and permitting it to set; and in then withdrawing said mold board:—thus providing a polylithic structure with partition walls of insulation material and having rigidly supported suspension rails for drawers in each compartment.

5. The process of making fire-resistant cabinet body open at the front and comprising an outer metal casing having an insulation lining and an insulation partition wall dividing said body into drawer compartments,—which consists in prefabricating a structure including the outer metal casing having back, side, top and bottom walls and a horizontal rail defining the openings to said compartments, thin metal, flanged, laterally spaced, vertically extending bars having perforate webs of depth equal to the required thickness of the insulation lining to be applied to each side wall, and suspension rails for drawers for each of the compartments fixed to said bars; then, after bringing it to a horizontal level, in pouring separately upon each wall the insulation material to the required depth of the insulation lining, first inserting in the plane of the rail mold bars to form grooves in the insulation on the side and back walls; in then removing said mold bars; then, after inserting within the body a removable mold board for the bottom of said partition wall, in applying the insulation material in like manner to the required depth on said mold board; and then in withdrawing said mold board:—thus providing a polylithic structure with partition walls of insulation material and having rigidly supported suspension rails for drawers in each compartment.

6. The process of making a fire-resistant cabinet body open at the front and comprising an outer metal casing having an insulation lining,—which consists in prefabricating a structure including the outer metal casing having back, side, top and bottom walls defining the opening to a compartment, thin metal, laterally spaced, vertically extending bars having perforate webs of depth equal to the required thickness of the insulation lining to be applied to each side wall, and suspension rails for a drawer for said compartment fixed to said bars; and then, after bringing it to a horizontal level, in pouring separately upon each wall the insulation material to the required depth of the insulation lining and permitting it to set:—thus providing a polylithic structure of insulation material and having rigidly supported suspension rails for drawers in said compartment.

7. The process of making a fire-resistant cabinet body open at the front and comprising an outer metal casing having an insulation lining and an insulation partition wall dividing said body into drawer compartments,—which consists in prefabricating a structure including the outer metal casing having back, side, top and bottom walls, a horizontal rail defining the openings to said compartments, thin metal, flanged, laterally spaced, vertically extending bars having perforate webs of depth equal to the required thickness of the insulation lining to be applied to each side wall, and suspension rails for drawers for each of the several compartments fixed to said bars; then disposing the metal casing in a position with one wall in a horizontal plane, in preparing insulation material mixed with water to the flowing consistency approximating that of cream, in pouring upon said last mentioned wall said insulation material and allowing it to flow over said last mentioned wall until it has attained a uniform level corresponding to the required depth of the insulation lining, and then permitting said insulation to set; in then treating each of the other walls of said casing in succession in like manner to provide an insulation lining therefor; then, after inserting within the body a removable mold board for the bottom of said partition wall, in pouring similarly prepared flowing insulation material in like manner to the required depth on said mold board, and then permitting it to set; and in then withdrawing said mold board,—thus providing a polylithic structure with a partition wall of insulation material and having rigidly supported suspension rails for drawers in each compartment.

MARION HUNTER BROWN,
*Special Administratrix of the Estate of David E. Hunter, Deceased.*